United States Patent Office 3,051,019
Patented Aug. 28, 1962

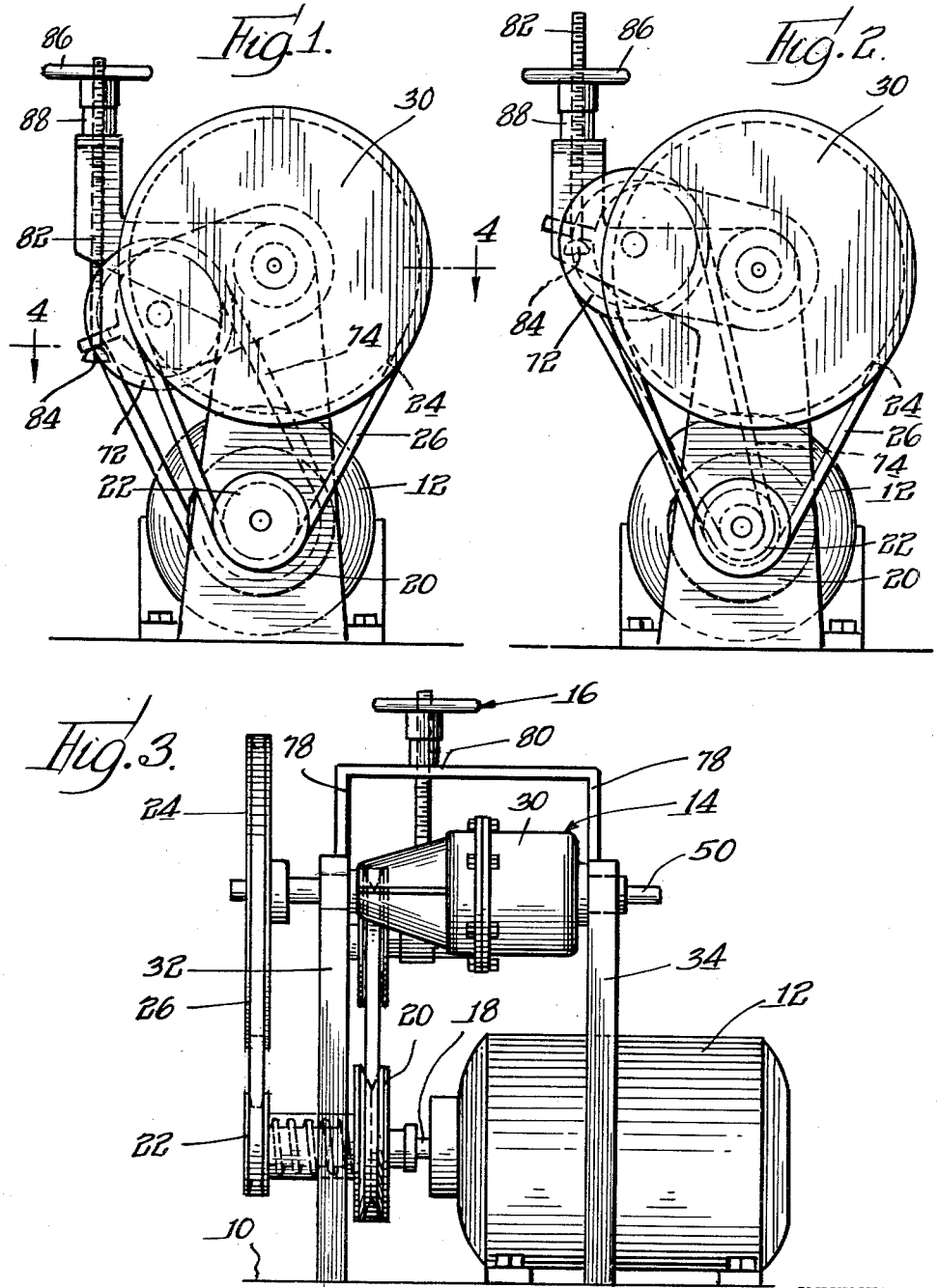

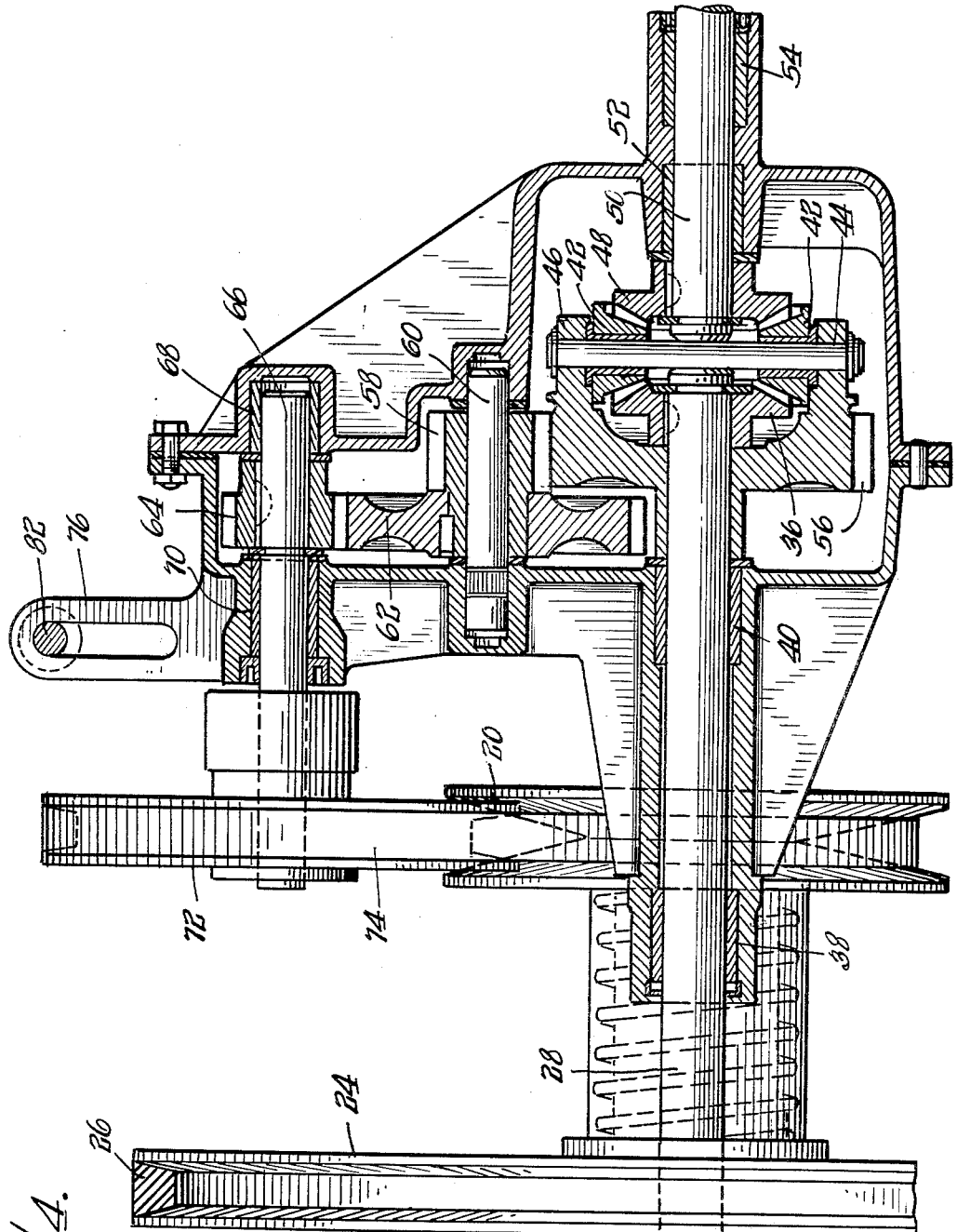

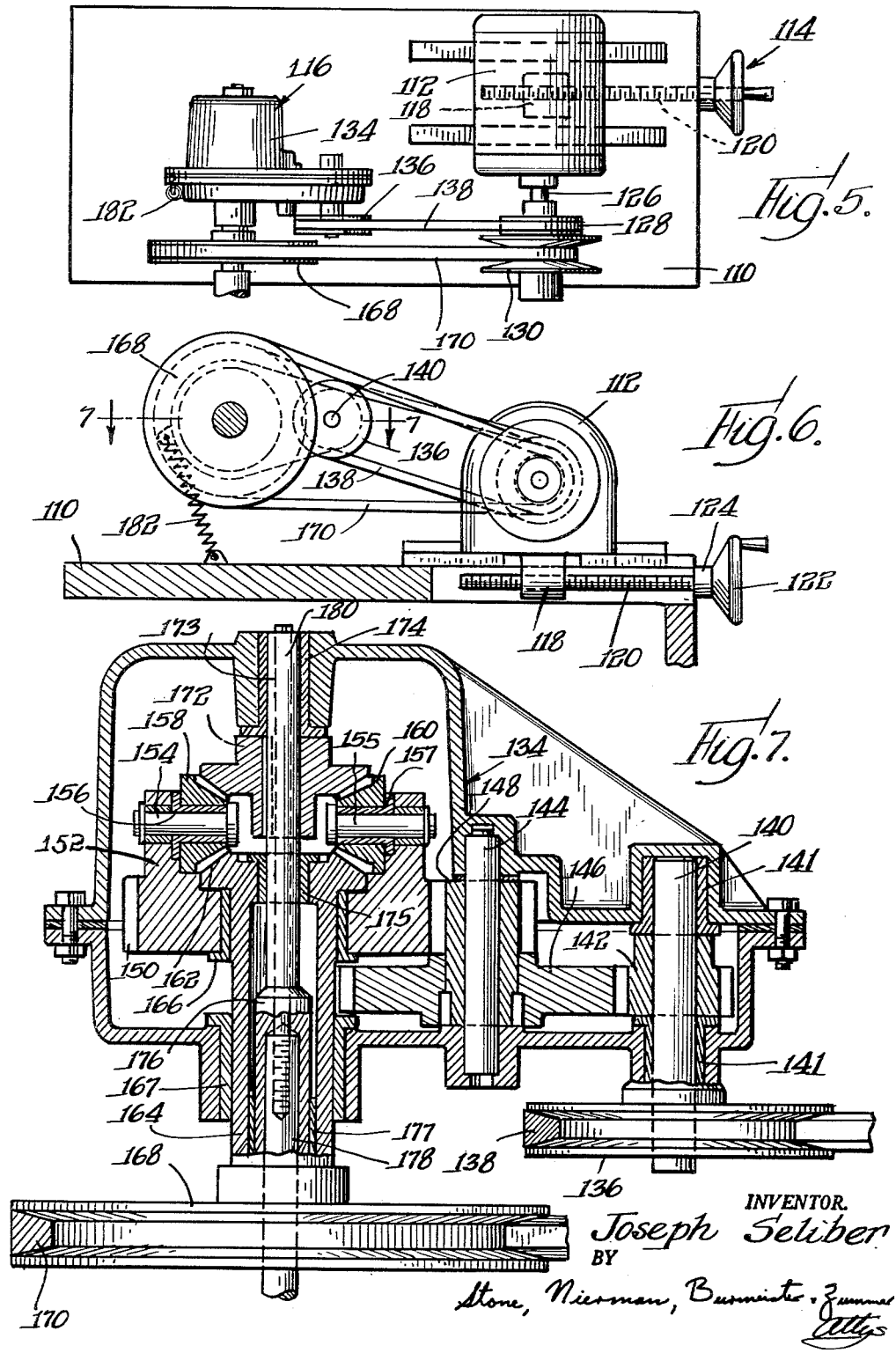

3,051,019
VARIABLE SPEED DRIVE
Joseph Seliber, 313 Hibbard Road, Wilmette, Ill.
Filed June 15, 1960, Ser. No. 36,403
6 Claims. (Cl. 74—689)

This invention relates to a novel variable speed drive which is a continuous drive having its output speed variable in a straight line relationship relative to the position of a control device.

Variable speed drives have many and varied modifications. However, there are no simple and inexpensive variable speed drives which may be used either continuously over an extended range of speeds or continuously over a very precise short range of speeds. Most of the present drives either have a continuous narrow range of speeds or have steps so that there is a gap in speeds from one step to another. Inasmuch as it is necessary to have a continuous extended range of speeds in certain applications, the continuous narrow range drives are combined with the second-mentioned drives. It is apparent that this type of an arrangement is particularly undesirable in a continuous operation where adjustments must be made during the course of the operation. Therefore, it is one of the objects of the hereindisclosed invention to provide a variable speed drive which is capable of delivering an output speed over a continuous wide range.

In certain drives, there is extensive circulating power which is fed back through the drive, which circulating power is undesirable. It is one purpose of this invention to provide a continuous variable speed drive which has a minimum of circulating power.

It is another object of the hereindisclosed invention to provide a continuous variable speed drive which is capable of operating over a wide range of horsepower.

It is a further object of the present invention to provide a variable speed drive which is continuous over a wide range and requires a minimum of space for its operation.

It is still another object of the instant invention to provide a low cost variable speed drive which is capable of being continuous over a wide range.

It is a still further object of this invention to provide a low cost variable speed drive which is capable of having a precisely controlled output speed.

Other objects and uses of the hereindisclosed invention will become readily apparent to those skilled in the art upon perusal of the appended specification in light of the drawings in which:

FIGURE 1 is an end view of a variable speed drive embodying the hereindisclosed invention drivingly connected to an electric motor with the control speed of the drive being at a maximum.

FIGURE 2 is an end view of the device shown in FIGURE 1 with the control speed being adjusted for a minimum;

FIGURE 3 is a side view of the hereindisclosed invention;

FIGURE 4 is a cross-sectional view taken on line 4—4 of FIGURE 1;

FIGURE 5 is a plan view of a variable speed drive embodying the hereindisclosed invention mounted on a driven shaft in which a motor driving the present embodiment moves relative to the driven shaft;

FIGURE 6 is a side view of the device shown in FIGURE 5; and

FIGURE 7 is a cross-sectional view taken on line 7—7 of FIGURE 6.

Referring now to the drawings and especially to FIGURE 3, a base 10 supports an electric motor 12. The motor is connected to a continuous variable speed drive embodying the instant invention which drive is generally indicated by numeral 14. The variable speed drive 14 is regulated by a controller 16 which angularly positions the drive to effect control of the output speed as will be hereinafter described in detail.

Electric motor 12 is a conventional electric motor which in this instance has an output speed of about 1800 revolutions per minute. The electric motor has a motor output shaft 18 which is connected to the variable speed drive 14. The motor output shaft 18 has two pulleys mounted thereon. One of the pulleys is a pulley 20 which has one side spring loaded to provide an adjustable variable sized pulley. The other pulley is a fixed size drive pulley 22 which is fixed to the shaft in a conventional manner. The drive pulley is connected to a constant speed pulley 24 by means of belt 26.

The constant speed pulley is keyed to input shaft 28 which is rotatably mounted in a housing 30, so that the output shaft is drivingly connected to input shaft 28 through the belt and the pulleys. The housing 30 is pivotedly mounted in two support pedestals 32 and 34 which are in turn fixedly mounted on base 10 in a conventional manner to hold the housing above the electric motor.

Referring now to FIGURE 4 it may be seen that the housing 30 has an input gear 36 mounted therein which gear is keyed to the input shaft 28 which shaft has the same axis of rotation as the housing has about the pedestals. It is apparent that the input shaft has a pair of bearings 38 and 40 positioned between the shaft and the housing to provide free rotation of the input shaft. A pair of planetary gears 42 mesh with the input gear 36, and those planetary gears are rotatable relative to the input shaft. Each of the planetary gears 42 are rotatably mounted on a planetary gear shaft 44 which is mounted in a planetary gear carrier 46. An output gear 48, which is identical to the input gear, meshes with the two planetary gears and has an output shaft 50 keyed thereto. The output shaft 50, having its axis of rotation coaxial with the input shaft, is rotatably supported in housing 30 by bearings 52 and 54 in much the same manner that bearings 38 and 40 support the input shaft. The output shaft extends without the housing 30 to provide a means for connecting to the variable speed drive as may be seen in FIGURE 3.

The carrier 46 has a carrier gear 56 formed integral therewith which carrier gear meshes with a carrier pinion 58 for a speed change therebetween. The carrier pinion is rotatably mounted on a stub shaft 60 which is parallel to the input and output shafts and is rotatable within housing 30. A variable speed gear 62 is keyed to the carrier pinion 58 for rotation therewith. A further speed change is provided by a variable speed pinion 64 which meshes with gear 62. The pinion 64 is in turn keyed to a variable speed shaft 66 which is supported by bearings 68 and 70 within the housing parallel to stub shaft 60. Shaft 66 extends outside the housing and a pulley 72 is fixed to the variable speed shaft. This pulley is drivingly connected to the aforementioned variable sized pulley 20 by a belt 74.

The housing 30 includes a slotted tang 76 to which is connected controller 16. The controller 16 includes a pair of columns 78 with a beam 80 supported between the columns. A threaded shaft 82 extends through beam 80 and is connected to the slotted tang 76 by tang lock 84. A wheel nut 86 is threadedly mounted on the upper end of the threaded shaft 82 with a bearing 88 between the wheel nut 86 and arm 80 so that the housing may be pivoted about the two support pedestals by turning the wheel nut.

As may be clearly seen in FIGURE 1, when the threaded rod 82 is extended downward, the housing 30 is pivoted about its pedestals so that the distance between the pulley 72 and the variable sized pulley 20 is at a minimum. Thus, there is a minimum reduction of speed between the two pulleys. However, when the rod is pulled upward as shown in FIGURE 2, the maximum distance between the two pulleys is produced; thereby, causing the greatest speed reduction between the two pulleys. It is apparent that inasmuch as the input and output shafts have the same axis of rotation as the housing, the rotation of the housing does not affect the distance between the drive pulley 22 and the constant speed pulley 24 nor the operation therebetween.

When the electric motor operates, of course, the variable sized pulley 20 and the drive pulley 22 rotate at the same speed. In this instance, the electric motor normally operates at 1800 r.p.m. There is a 3 to 1 reduction from the drive pulley 22 to the constant speed pulley 24 so that the input shaft 28 rotates at 600 r.p.m. as does the input gear 36. The speed of carrier 46 is regulated by the distance between the variable sized pulley 20 and the variable speed pulley 72 to effect control of the speed of output shaft 50 while the speed of input shaft 28 remains constant. The variable sized pulley 20 rotates at 1800 r.p.m. as does the drive pulley 22 and belt 74 connects the pulley 20 with pulley 72. As the distance between the two pulleys is varied, the speed of pulley 72 is continuously varied. The variable speed shaft rotates at the same speed as pulley 72 so that the speed of gear 62 varies directly with the speed of variable speed pulley 72 through there is a reduction of speed. There is a second speed reduction between carrier pinion 58 and the carrier gear 56 though the variance of the speed is directly proportional. The succession of speed reductions from the motor output shaft to carrier reduces the speed so that the speed of the carrier is continuously variable between 100 and 300 r.p.m.

Although the carrier speed is between 100 and 300 r.p.m. depending upon the angular position of the housing, the impressed speed upon the output gear through the planetary gear varies linearly between 0 and 400 r.p.m. relative to the angular position of the housing.

It is evident that the speed range of the output shaft 50, which may be connected to any suitable device, is without any step, but rather its speed has a continuous linear range from 0 to 400 r.p.m. As the wheel nut 86 is turned to raise or lower the slotted tang, the variable speed pulley is positioned closer and further away from the variable sized pulley, thereby determining the reduction from the variable sized pulley to the variable speed pulley. Thus, the speed of the carrier is regulated thereby regulating the output speed of the device. It is clear that the instant device has a minimum of circulating power since there is a three to one reduction from the motor to the input shaft.

Referring now to FIGURES 5 through 7, a modification of the instant invention is shown therein. A device embodying the instant invention and generally indicated by numeral 116 is show suspended on a driven shaft of a cooperative device and a driving motor is positioned on a base upon which motor is moved back and forth to tighten or loosen the variable sized pulley in order to obtain necessary speed control. A base 110 has an electric motor 112 slidingly mounted thereon. A speed control device 114 positions the motor to regulate the output speed of the variable speed drive 116. The electric motor 112 includes a nut 118 to which is connected the controller 114. The controller 114 includes a threaded shaft 120 which is threadedly mounted within nut 118. The shaft is in turn connected to wheel 122 which has a bearing 124 between the wheel and base 110. As the wheel is appropriately turned the motor 112 is moved back and forth on base 110.

The electric motor 112 includes a motor output shaft 126 which has a pair of pulleys mounted thereon. One of the pulleys is a constant speed drive pulley 128 and the other is a variable sized pulley 130 which is similar in construction to the above-described variable sized pulley 20.

The drive 116 includes a housing which has a carrier pulley 136 rotatably mounted thereon. The carrier pulley 136 is connected to pulley 128 by a belt 138 in a conventional manner. The housing has an outer shaft 140 rotatably supported by a pair of bearings 141. The outer shaft has the carrier pulley 136 keyed to a portion of the shaft extending without the housing and a pinion 142 keyed to a portion within the housing, so that the pinion 142 and pulley 136 rotate together. An intermediary shaft 144 is rotatably mounted wholly within the housing parallel to the outer shaft. An intermediary gear 146 is mounted on the intermediary shaft and the gear meshes with pinion 142 to provide a speed reduction. Rotating with the intermediary gear is an intermediary pinion 148 which has the gear 146 fixed to it. Meshing with the intermediary pinion is a carrier gear 150 for a further speed reduction. The carrier gear is an integral part of a carrier 152 which has an axis of rotation parallel to the aforementioned intermediary shaft.

A pair of planetary gear shafts 154 and 155 is fixed in carrier 152. Planetary gears 158 and 160 are mounted on shafts 154 and 155 respectively with bearings 156 and 157 pressed into gears 158 and 160 respectively. Planetary gears 158 and 160 mesh with an input gear 162 within the carrier. The input gear is fixed to a hollow input shaft 164. The input shaft 164 rotatably supports carrier 152 with a bearing 166 positioned between the carrier and the shaft, so that the carrier and the shaft have the same axis of rotation. Another bearing 167 between the input shaft and the housing allows the input shaft to rotate freely within said housing. A portion of the input shaft extends outside the housing and that portion has an input pulley 168 keyed thereon. The input pulley is connected to the variable sized pulley 130 by means of a belt 170, thereby connecting the input gear with the output of the electric motor through a continuous variable speed drive means.

The aforementioned planetary system of planetary gears 158 and 160 and input gear 162 is completed by an output gear 172 which meshes with both of the planetary gears. The output gear 172 is keyed to hollow output shaft 173 which is rotatably mounted in the housing and extends through the input gear into the interior of the input shaft so that the axis of rotation of both the input and output shafts is the same. A bearing 174 rotatably supports the output shaft in the housing and a second bearing 175 is positioned between the output shaft and the input gear. The output shaft 173 has integral with one end, an internally splined hub or connector shaft 176 wholly within the input shaft, which hub has a bearing 177 between it and the input shaft for free rotation. It is understood that even though this device has the output shaft wholly within the housing and the input shaft, the output shaft may be extended so that it protrudes for coupling to a driven shaft. It is further understood that the instant bearings may be replaced by roller, ball or other suitable bearings and seals may be used to seal the housing for holding oil or any other suitable lubricant.

As was mentioned above, the instant drive is connected to a shaft 178 of another driven or controlled device (which is not shown in this instance) which supports the aforementioned drive. In this instance shaft 178 is splined and is received within hub 176 for rotation with the output shaft. The output shaft and driven shaft 178 are held together by a long bolt 180 which extends through the length of the output shaft and is threaded into the end of the driven shaft. It is obvious that the entire drive 116 is supported upon the end of driven shaft 178.

Although the belt 138 prevents free rotation of the housing, a spring 182 is attached to the housing and the base in order to maintain tension on belt 138.

The instant device operates in much the same manner that the aforementioned variable speed drive operates. The electric motor 112 provides the source of rotational energy which motor drives pulleys 128 and 130 at the same speed. The variable sized pulley 130 drives the input pulley 168 through belt 170 so that the speed of the input pulley may be varied. The input pulley 168 is keyed to the input shaft 164 for rotation therewith which shaft in turn drives the input gear 162. The pulley 128 drives the carrier pulley 136 through belt 138 at a constant speed. The pulley 136 in turn drives the carrier 152 through pinion 142 and gear 144 for a first reduction and then through pinion 148 and gear 150 for a second reduction. The rotation of carrier 150 rotates the planetary gears 158 and 160 which constantly mesh with input gear 162. Inasmuch as output gear 172 meshes with both of the planetary gears, the output gear 172 is driven at a speed which is the combination of the speed of the carrier and the input gear. The output gear drives the output shaft 174 at a speed which is controlled by the position of the electric motor which regulates the variable speed input to pulley 168.

As the electric motor is positioned further away from the input gear, the distance between the variable sized pulley 130 and input pulley 168 is increased so that there is a greater reduction. However, the distance between pulley 128 and pulley 136 remains constant inasmuch as the housing 134 is allowed to pivot about the pedestal.

As the electric motor 112 moves closer toward the drive, the distance between pulleys 168 and 130 is reduced and the reduction between those two pulleys is lessened. However, the distance between pulleys 128 and 136 remains constant inasmuch as the housing is free to pivot about the pedestal.

Although specific embodiments of the hereindisclosed invention have been set forth, it is expressly understood that the scope of the present invention is to be limited only by the appended claims.

What is claimed is:

1. A continuous variable speed drive for use with a single source of rotational energy, said drive including, a pair of spaced supports, a housing pivotedly mounted on said supports, an input shaft rotatably mounted in said housing, drive means drivingly connecting the input shaft to the source of rotational energy, a drive gear drivingly connected to the input shaft within said housing, a planetary gear meshing with the drive gear, a carrier rotatably supporting said planetary gear, a second drive means drivingly connecting the carrier and the source of rotational energy, said second drive means including a belt and continuous variable sized pulley, an output gear meshing with said planetary gear, an output shaft drivingly connected to said output gear, and means for selectively positioning the housing on said supports to determine the effective diameter of said variable sized pulley to regulate the speed of said output shaft.

2. A continuous variable speed drive comprising, in combination, a housing, an input shaft rotatably mounted in said housing, said input shaft drivingly connected to a source of rotational energy, a drive gear being fixed to said input gear for rotation therewith, a plurality of planetary gears meshing with said drive gear, a carrier rotatably supporting said planetary gears, said carrier being driven by a first reduction means, a second input shaft rotatably supported in said housing, said second input shaft being drivingly connected to the speed reduction means for driving the carrier, said second input shaft being drivingly connected to the source of rotational energy through a continuous variable speed pulley for rotation at a speed variable with respect to the first-mentioned input shaft and is dependent upon the speed of said first-mentioned input shaft, an output gear meshing with the plurality of planetary gears, and an output shaft fixed to said output gear, said output shaft being coaxial with the first-mentioned input shaft, whereby the speed of the output shaft is regulated by pivoting the housing about the centerline of the first-mentioned input shaft and the output shaft to adjust the size of the variable sized pulley thereby regulating the speed of the carrier.

3. A continuous variable speed drive comprising, in combination, a pair of shafts being aligned on the same centerline, each of said shafts having one end protruding from the housing, one of said shafts being an input shaft and having its protruding end drivingly connected to a source of rotational energy, the other of said shafts having its free end adapted for attachment to a suitable driven means, a third shaft rotatably mounted in said housing and being parallel to the input shaft, said third shaft being drivingly connected to the source of rotational energy through a variable sized pulley for rotation at a speed variable with respect to the input shaft, a carrier rotatably mounted on the first-mentioned input shaft and said carrier being drivingly connected to the third shaft through a speed change means, a pair of planetary gears rotatably mounted on said carrier in engagement with the drive gear, an output gear meshing with the planetary gear fixed to the output shaft for rotation therewith, said housing pivotedly supported relative to the source of rotational energy, means for pivoting the housing about the centerline of the two shafts for controlling the size of the variable sized pulley thereby effecting a speed change of the carrier whereby the speed of the output shaft is regulated by the pivotal position of the housing though the two input shafts are connected to the same single source of rotational energy.

4. A continuous variable speed drive comprising, in combination, a housing, an output shaft rotatably mounted in said housing, an output gear fixedly connected to said output shaft for rotation therewith, a pair of planetary gears meshing with said output gear, a carrier rotatably supporting said planetary gears, an input shaft rotatably mounted in said housing, variable speed drive means connecting said input shaft with a source of rotational energy, speed reduction means connecting the input shaft with the carrier shaft at a fixed speed reduction, a drive gear meshing with the planetary gears, a second input shaft drivingly connected to the drive gear for rotation therewith, said second input shaft being drivingly connected to the source of rotational energy at a speed variable with respect to the first-mentioned input shaft and is dependent upon the speed of said first-mentioned input shaft, a base supporting said source of rotational energy, screw means connected to said base for pivoting the housing to control the variable speed input to the first-mentioned shaft, whereby the speed of the output shaft is regulated by the screw means.

5. In a continuous variable speed drive having a source of rotational energy, said drive comprising, in combination, a base supporting said source of rotational energy, a pair of spaced supports mounted on said base, a housing pivotedly mounted on said spaced supports, an input shaft rotatably mounted in said housing, said input shaft being drivingly connected to the source of rotational energy, a drive gear fixed to said input shaft within said housing, a carrier rotatably mounted on said input shaft, a pair of planetary gears rotatably mounted on said carrier and meshing with said input gear, a second input shaft rotatably mounted in said housing, said second input shaft being drivingly connected to the source of rotational energy through a variable sized pulley and belt, speed reduction means connecting the second input shaft and the carrier in a fixed speed reduction, an output gear meshing with said planetary gears, an output shaft connected to the output gear, said output shaft rotatable within said housing and extending from said housing, and a screw member connected to said housing and cooperative with said base for pivotedly adjusting the housing to regulate the effective size of the variable sized pulley, whereby the speed of the output shaft is regulated by the position of the housing.

6. A continuous variable speed drive comprising, in combination, a base, a source of rotational energy moveably mounted on said base, a screw member cooperative with said base and said source of rotational energy to selectively position the source of rotational energy, a vertical support mounted on said base and spaced from said source of rotational energy, a housing pivotedly mounted on said support, a spring secured to said housing and to said base, an input shaft rotatably mounted in said housing, the axis of said input shaft being substantially perpendicular to the direction of the movement of said source of rotational energy, said input shaft being drivingly connected to the source of rotational energy, a second input shaft having its axis of rotation coextensive with the axis about which the housing pivots, said second shaft being rotatably mounted in said housing, means drivingly connecting the second shaft with the source of rotational energy, said means including a variable sized pulley and a belt, a drive gear connected to the second input shaft, a plurality of planetary gears meshing with the drive gear, a carrier rotatably supporting said plurality of planetary gears, speed reducing means drivingly connecting the carrier and the first-mentioned input shaft at a fixed speed reduction, an output gear meshing with the planetary gears, an output shaft drivingly connected to the output gear and extending outside of the housing, whereby the source of rotational energy is moved to determine the effective size of the variable sized pulley and the connection between the first-mentioned input shaft and the source of rotational energy is maintained by the pivoting of the housing in the support and the spring between the housing and the base holds the housing in an effective position.

References Cited in the file of this patent

UNITED STATES PATENTS

| | | |
|---|---|---|
| 313,831 | Metzger et al. | Mar. 10, 1885 |
| 2,092,241 | Brasseur | Sept. 7, 1937 |
| 2,200,101 | Schmitter | May 7, 1940 |

FOREIGN PATENTS

| | | |
|---|---|---|
| 911,705 | France | Apr. 1, 1946 |